United States Patent [19]

Kekewich et al.

[11] Patent Number: 4,715,079
[45] Date of Patent: Dec. 29, 1987

[54] WASHING APPARATUS

[75] Inventors: Douglas E. Kekewich, Islington; Wendall Nelson, Brampton, both of Canada

[73] Assignee: Wash World Industries Limited, Canada

[21] Appl. No.: 922,611

[22] Filed: Oct. 24, 1986

[30] Foreign Application Priority Data

Oct. 23, 1986 [CA] Canada .................. 521239

[51] Int. Cl.<sup>4</sup> .............................. B60S 3/06
[52] U.S. Cl. .................. 15/97 B; 15/53 AB; 15/DIG. 2
[58] Field of Search .......... 15/DIG. 2, 53 A, 53 AB, 15/97 B

[56] References Cited

U.S. PATENT DOCUMENTS 3,332,098  7/1967  Smith ........................ 15/DIG. 2
3,522,619  8/1970  Weigele ...................... 15/53 AB

*Primary Examiner*—Edward L. Roberts
*Attorney, Agent, or Firm*—Rogers, Bereskin & Parr

[57] ABSTRACT

A washing apparatus, for use in a vehicle washing installation, has a support and first and second arms pivotally mounted to the support. The arms extend out towards the vehicle path, with one arm extending forwardly and the other extending rearwardly. Washing wheels are rotatably mounted at the ends of the arms. A drive is provided for rotating the washing wheels, in opposite directions and such as to urge the wheels away from a vehicle body. The washing apparatus can be used to wash rocker panels and wheel wells of vehicles. Optionally, a link is provided between the two arms, to cause the two wheels to move in unison towards and away from a vehicle body. In this case, the forwardly extending arm engages the vehicle first, and the link ensures that the rearwardly extending arm does not engage the vehicle body excessively.

21 Claims, 3 Drawing Figures

WASHING APPARATUS

FIELD OF THE INVENTION

This invention relates to a washing apparatus, for use in a vehicle washing installation. This invention more particularly relates to a washing apparatus including rotatably mounted washing wheels for washing the rocker panels, wheels etc. of cars.

BACKGROUND OF INVENTION

At the present time, a common arrangement for a car washing installation provides a vehicle path, along which the cars travel. Often, a mechanism is provided to control and guide the movement of the cars along the path. To wash the cars, various equipment is provided along the path. Such equipment applies water to the vehicle body and washing compounds as required. Often, various rotatably mounted brushes are provided to wash and polish the surface of the vehicle. To accommodate different vehicle sizes etc., these brushes are usually rotatably mounted on the end of an arm. Some automatic guidance arrangement is then provided, to move the arm transversely across the path on the end of the arm, so that it is always at a correct position relative to a vehicle body.

Thus, our earlier Canadian Pat. No. 1,183,758 discloses an automobile washing apparatus, which includes a pivoting arm assembly. The arm assembly has primary and secondary arms, and a brush rotatably mounted about a vertical axis at one end. The mechanism is such that the brush will travel across the front of a vehicle, along one side and then across the back of the vehicle, returning to a rest position.

Whilst mechanisms such as that outlined above can provide thorough washing over the majority of a vehicle body, the current shape of car bodies presents some difficulties. In particular, the wheel wells in the body sides and the wheels themselves are difficult to clean. The apparatus of our earlier Canadian patent has brushes which extend the full height of the car. Consequently, although they can accurately follow the side of the car, they will not enter the wheel wells significantly, which can result in them being improperly cleaned. This problem is common to washing apparatus, having brushes extending the height of the vehicle.

Accordingly, proposals have been made for the provision of special side brushing or washing wheels, specifically arranged for scrubbing, washing etc. the rocker panels and wheels of a vehicle. One such proposal can be found in the Belanger U.S. Pat. No. 4,530,126. This apparatus includes on each side, so-called side wheel assemblies, for automatically scrubbing, washing and polishing the sides, rocker panels and wheels of a vehicle. Each assembly includes a pair of parallel and spaced apart wheel arms, each being pivotally mounted at one end. A scrubbing, washing and polishing wheel of cloth material is pivotally mounted at the other end of each arm. The arms are connected, so as to form a pivoted parallelogram linkage. The wheels of the two arms are rotated in opposite directions. This has the advantage of providing thorough cleaning of the relevant parts of the car; particularly when cleaning irregular surfaces such as wheels and the periphery of wheel wells etc., a single rotating brush may not provide thorough cleaning.

A disadvantage with this arrangement is that whilst the angle of one arm and the direction of rotation of its wheel naturally tends to urge the wheel away from the vehicle, because the other wheel rotates in the opposite direction the reverse is true. Thus, for the other wheel, its direction of rotation can pull it towards the vehicle. This is a particular problem with wheel wells. When the two brushes on their parallelogram linkage encounter a wheel well, one brush can catch the edge of the wheel well and pull itself into the wheel well. As it further enters the wheel well, it becomes more strongly engaged with the side of the body, which tends to increase the force urging it into the wheel well. In extreme cases, the wheels can damage the vehicle body, e.g. by bending edges of plates around the wheel well.

This problem has been recognized and is addressed in the Belanger U.S. patent by providing a pneumatic-hydraulic control circuit. This relies upon a pilot operated check valve, that is controlled by pneumatic pressure. A three-way valve in a pneumatic supply line controls the check valve. In effect, the check valve is controlled so that, in the absence of a vehicle body, it is open, to permit the side scrubbing wheels to extend out, ready for the next vehicle body. When a vehicle is present, the pilot check valve is closed. This in effect prevents extension of the side scrubbing wheels outwards, and only permits them to move inwards. When working correctly, this will prevent the side scrubbing wheels being drawn or sucked into a wheel well. However, this arrangement has a number of disadvantages. Firstly, when the check valve is closed, the movement of the side scrubbing wheels is restricted, so that they may not accurately follow the side profile of a vehicle. More importantly, the control depends on a relatively complex control system involving both pneumatic and hydraulic components, and numerous valves, reservoirs etc. If the control system malfunctions, then it is possible for a side scrubbing wheel to be drawn into a wheel well, with possible resultant damage to the vehicle body.

BRIEF SUMMARY OF THE INVENTION

What is required is an arrangement of washing and brushing wheels for a vehicle washing installation, in which the wheels can rotate in opposite directions and accurately follow the contour of a vehicle body, without danger of the wheels being drawn into wheel wells or otherwise engaging the vehicle body, damaging the vehicle body. Further, it is to be borne in mind that a vehicle washing installation is a relatively harsh environment, unsuited to equipment that is delicate. Accordingly, it is desirable that such an apparatus should be simple and robust, and should not rely on any complex control arrangement.

In accordance with the present invention, there is provided a washing apparatus, for use in a vehicle washing installation in which the vehicle is moved forwardly along a vehicle path, the washing apparatus comprising a support means, first and second arms, which are longitudinally spaced relative to the vehicle path and each of which is pivotally mounted at one end thereof and at a respective pivot location to the support means and extends towards the vehicle path, with the first arm extending forwardly and the second arm extending rearwardly, a first washing wheel rotatably mounted to the other end of the first arm, a second washing wheel rotatably mounted to the other end of the second arm, drive means for rotating the first washing wheel so that the vehicle-engaging side thereof travels rearwardly and for rotating the second washing wheel so that the vehicle-engaging side thereof travels forwardly, and biasing means urging the first and second washing wheels towards the vehicle path.

Preferably, the apparatus includes a linkage means pivotally connected to the first and second arms and such that the first and second washing wheels move together towards and away from the vehicle path.

In the washing apparatus of the present invention, the two arms are inclined in opposite directions, one being inclined forwardly and the other rearwardly, with the arms extending towards one another. This has the advantage that the two washing wheels can be rotated in opposite directions, and can still be mounted so that they tend to urge their respective arms away from the vehicle body.

Conventionally in this field it was though that the arms had to extend forwardly. It was thought that rearwardly extending arms would have a natural tendency to engage the vehicle excessively, e.g. at the front of the vehicle or in the wheel wells. If this occurred, then the vehicle would urge the arm forward and hence into greater engagement with the vehicle, resulting ultimately in damage to the vehicle and/or installation. Applicants have now realized that it is indeed possible to have one arm directed rearwardly, provided its washing wheel rotates such that its vehicle-engaging surface or side travels forwardly. This then tends to push the arm away. Also, since the allowance for varying vehicle widths can create problems at the front of the vehicle, the two arms can be linked together so that the first arm pulls the second arm back to prevent excessive engagement at the front of a vehicle. However, for washing wheels on the guided, usually the driver's, side of a vehicle this is usually not such a great problem, since these wheels have a restricted range of movement. Accordingly, the linkage is usually unnecessary on the driver's side.

To prevent the rearwardly extending arm becoming excessively engaged, the linkage means is provided. With the arms extending towards one another, this ensures that the forwardly facing arm pulls the rearwardly facing arm back to the correct location. For some installations it may be feasible to have the arms facing in opposite directions, but then the rearwardly facing arm engages the vehicle first.

It is expected that this should provide a reliable mechanism, with little or no tendency for the washing wheels to engage the front of a vehicle excessively, or to be dragged into wheel wells. Further, it does not rely on any complex control system, but rather a mechanism which can be more reliable.

BRIEF DESCRIPTION OF THE DRAWINGS

For a better understanding of the present invention, and to show more clearly how it may be carried into effect, reference will now be made, by way of example, to the accompanying drawings, in which.

DESCRIPTION OF PREFERRED EMBODIMENT

Figure 1:
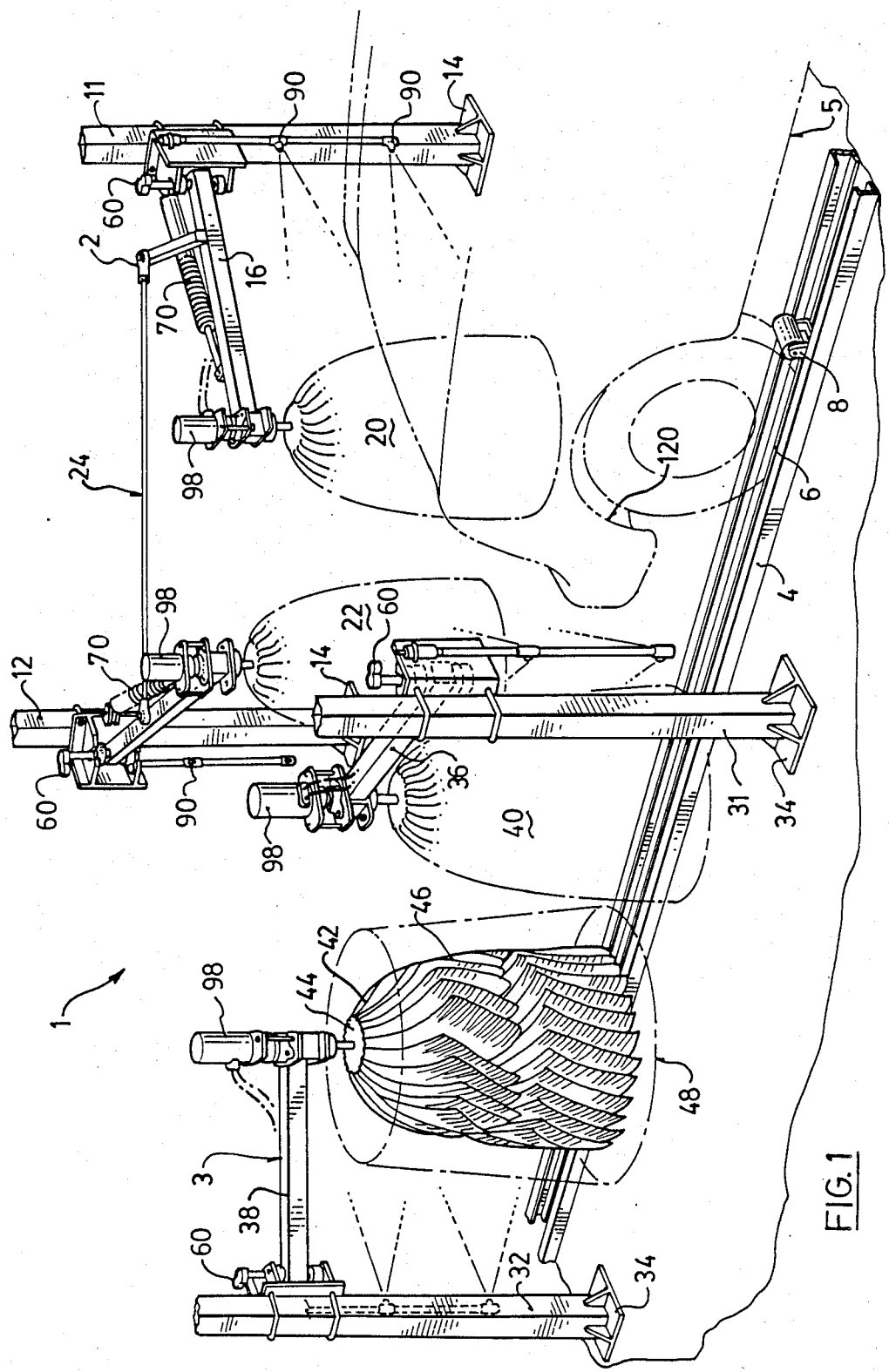
FIG. 1 is a perspective view of a washing apparatus in accordance with the present invention incorporated in a vehicle washing installation.

The apparatus of the present invention is suitable for use in a modular car or vehicle washing apparatus. In such apparatus, different modules are provided, such as a variety of washing modules, a drying module, a waxing module etc. The user selects the modules desired, and these are then assembled to form the complete washing installation. For simplicity and clarity, in the drawings only the apparatus of the present invention is shown, although it is to be understood that it would be usually incorporated into a complete washing installation.

Figure 2:
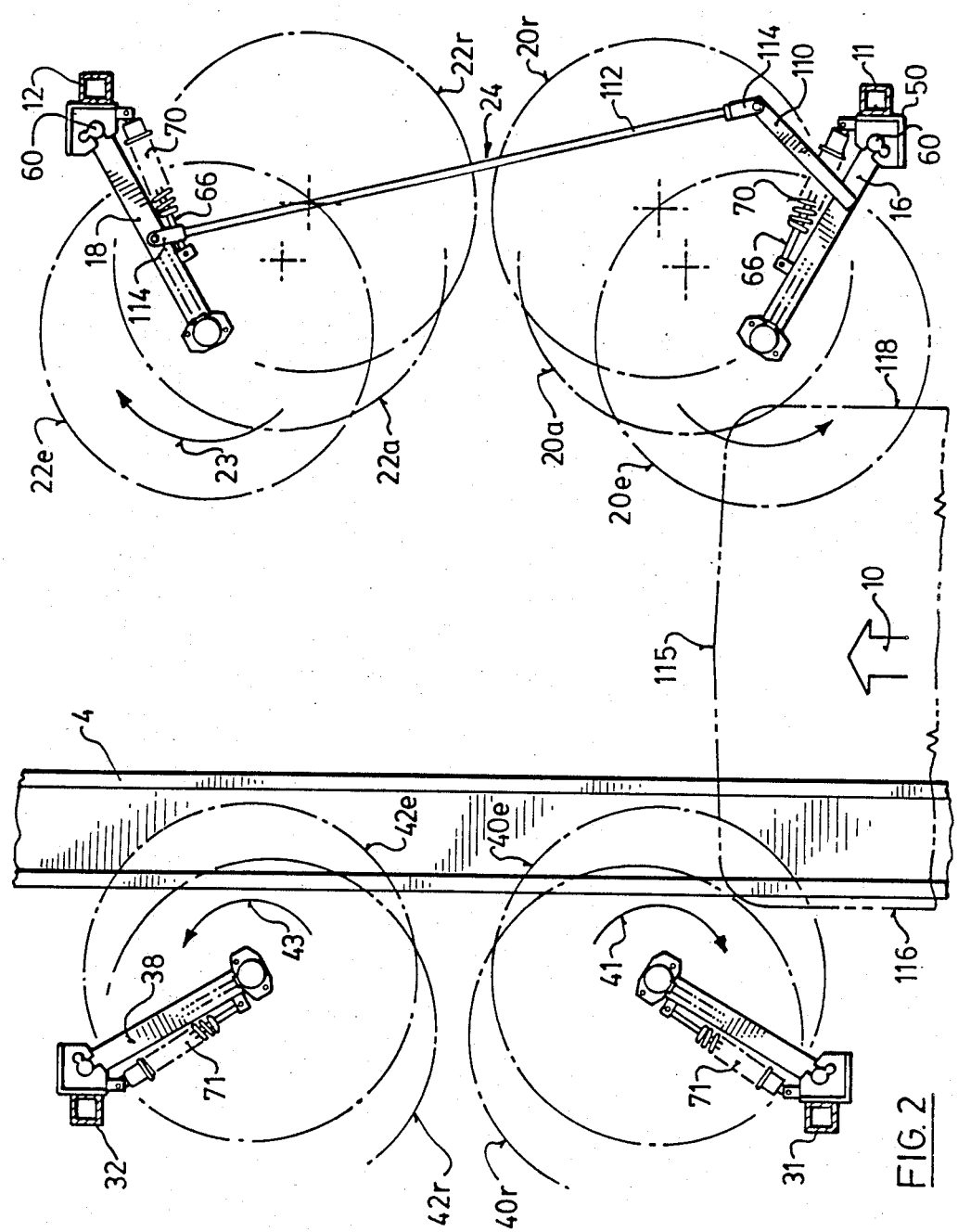
FIG. 2 is a plan view of FIG. 1 showing operation of the apparatus.

In the drawings, the washing apparatus is generally denoted by the reference 1. The apparatus 1 includes a passenger's side assembly 2 having two washing wheels, and a driver's side assembly 3 also having two washing wheels. In known manner, for movement of individual cars, a guide channel 4 is provided. Part of a car is shown in outline at 5. The driver's side wheels of the car 5 are located in the guide channel 4, as indicated at 6. Within the guide panel 4, there is a drive mechanism in the form of a chain (not shown) and rollers 8. In known manner, the chain propels the rollers 8, and hence the vehicle 5 through the washing installation. The guide channel 4 guides the car 5 along a path indicated by the arrow 10 (FIG. 2).

The passenger's side assembly 2 comprises first and second support columns 11 and 12, which are generally indentical. These support columns 11, 12 are formed from generally rectangular section steel and are provided with base plates 14. The base plates 14 rest on the floor and are secured. The upper ends (not shown) of the columns 11, 12 would be secured to, or integral with a canopy above the vehicle path 10. A first arm 16 is pivotally mounted at one end to the first column 11, whilst a second arm 18 is correspondingly pivotally mounted at one end to the second column 12. Corresponding first and second brushing wheels 20, 22 are rotatably mounted at the other, free ends of the arms 16, 18. Details of the brushing wheels 20, 22 are given below. A link 24 is pivotally connected at either end to the two arms 16, 18.

The driver's side assembly 3 of the apparatus 1 is similar to the passenger's side assembly 2 in many ways. This driver's side assembly 3 has third and fourth support columns 31, 32. These include corresponding base plates 34, and the columns 31, 32 are mounted similarly to the columns 11, 12. A third arm 36 is pivotally mounted to the third column 31, whilst a fourth arm 38 is pivotally mounted to the fourth support column 32. Third and fourth washing wheels 40, 42 are rotatably mounted about vertical axes at the other ends of the third and fourth arms 36, 38.

The fourth washing wheel 42 is shown in detail, with the other washing wheels having a similar construction. The washing wheel 42 can be of known construction. It has a cylindrical hub 44, defining a number of axially extending slots on its surface. A series of cloth flaps or pieces 46 have mounting edge strips, which engage the slots of the cylindrical hub. In FIG. 1, the washing wheel 4 is shown in a rest position, in which the cloth flaps 46 hang downwardly. In use, centrifugal effects cause the cloth flaps 46 to be thrown outwards, to form the generally frustro-conical shape indicated at 48. Thus, the bottom of the wheel 42 has a larger diameter around the top. The shape of the washing wheels should be chosen, to suit the particular application, and the shapes of vehicle bodies encountered. Here, the washing wheel 42 tapers slightly, to allow for the fact that the sides of most car bodies incline inwards towards the bottom.

Details of the mechanisms associated with the arms 16, 18, 36 and 38 and the respective washing wheels 20, 22, 40 and 42 are all generally similar. For simplicity, the mechanism associated with the second arm 18 is described below, with relation to FIG. 3. It is to be understood that the other mechanisms generally correspond, as explained below.

Figure 3:
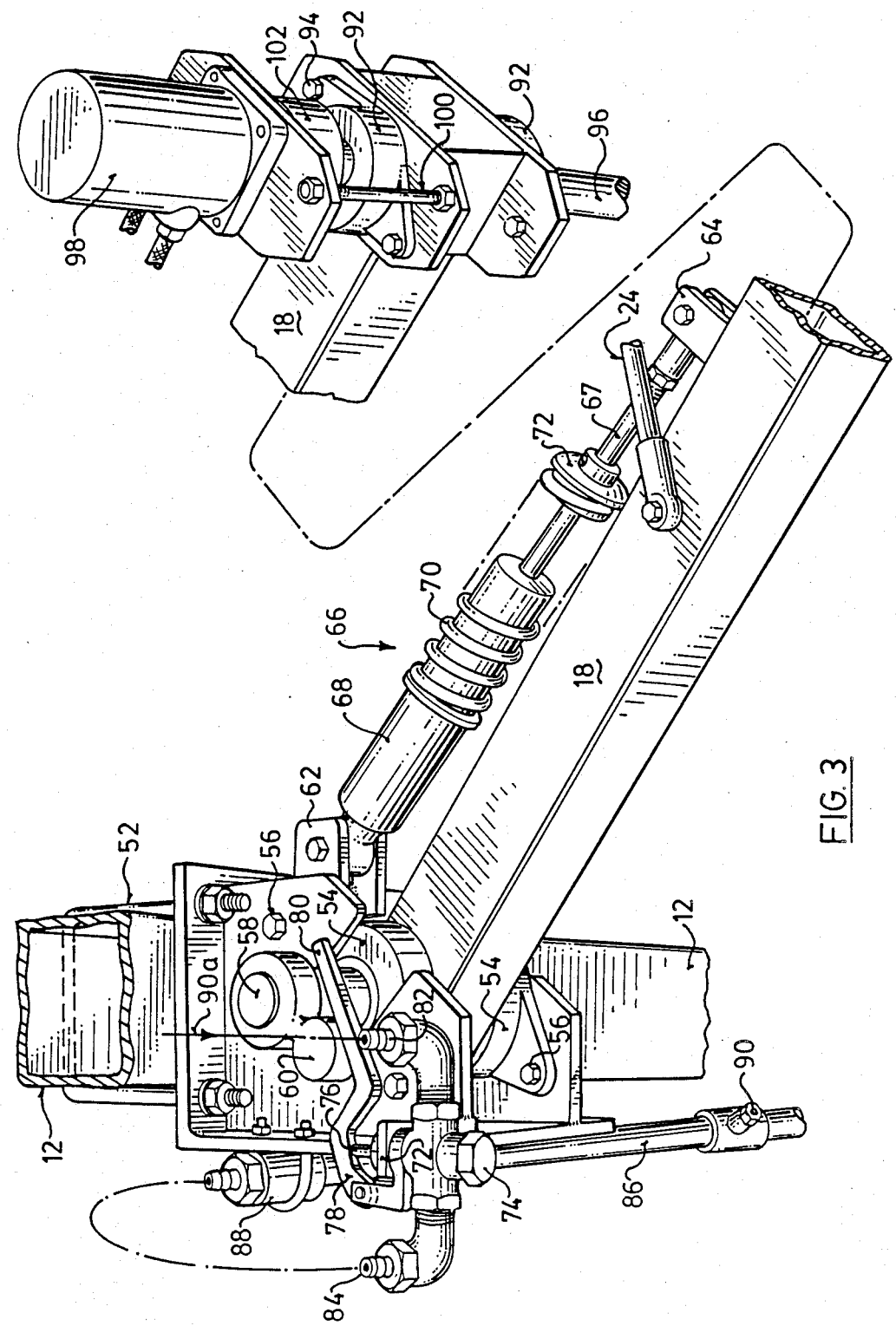
FIG. 3 is a perspective view on an enlarged scale of part of the apparatus of FIG. 1.

With reference to FIG. 3, a bracket 50 is formed from sheet steel. It is secured at its top and bottom by means of U-shape bolts and nuts 52. The U-shape bolts 52 extend around the respective second column 12. Bearings 54 are provided for the second arm 18. These bearings 54 are retained by bolts 56, in known manner. The arm 18 is mounted on a respective second shaft 58, mounted in the bearings 54. The shaft 58 extends upward, and a cam member 60 is secured to it. The cam member 60 comprises a ring portion on the shaft 58, and a generally circular extension to one side.

Corresponding U-shape subsidiary brackets 62 and 64 are provided on the main bracket 50 and the second arm 18. A shock absorber or damper 66 is pivotally mounted between these subsidiary brackets 62, 64. In known manner, the damper 66 comprises a piston 67 and a cylinder 68. A compression spring 70 is mounted between the cylinder 68 and a collar 72 secured to the shaft of the piston 67. The collar 72 can be adjusted on the piston 67, to give the required compression in the spring 70.

A mounting 73 is provided on the bracket 50 for a water valve 74. The water valve 74 has a plunger 76 to actuate it. The valve 74 includes an actuating lever 78 pivotally attached at one end to its body and extending across the top of the plunger 76. The lever 78 includes a cam arm 80, arranged for contact with the cam 60.

The water valve 74 has an inlet 82 and an outlet 84. A pipe 86 has an inlet 88, which is connected to the outlet 84. The direction of water flow is indicated by an arrow 90. The pipe 86 is provided with spray jets 90, in known manner (FIG. 1).

The free end of the arm 18 is shown at the right hand side of FIG. 3. Here, upper and lower bearings 92 are held in position by bolts 94, in known manner. A shaft 96 of the second washing wheel 22 extends through the bearings 92. An hydraulic motor 98 is mounted by bolts 100 to the end of the arm 18. A coupling 102 is provided between the shaft of the motor 98 and the shaft 96. This arrangement of the drive for the washing wheel 22 can be largely conventional.

The first arm 16 and associated components largely correspond to those for the second arm 18. However, as most clearly seen in FIG. 2, the first arm 16 is arranged extending out from its support column 11 and forwardly relative to the car path 10. The second arm 18 is arranged also extending outwardly from its column 12, but it extends rearwardly relative to the car path 10. For this reason, the bracket 50 and associated components of the first arm 16 is a mirror image of the bracket 50 shown in FIG. 3. This is shown in FIG. 2. Thus, whereas the cam 60 in FIG. 3 contacts the cam arm 80 by counterclockwise movement, the cam 60 for the first arm 16 will come into contact with its respective cam arm 18 by a clockwise movement. Als, the spring and damper assembly 66, 70 for the first arm 16 is on the other side of the arm, as compared to the second arm 18.

Further, the first arm 16 includes a side extension 110. Whereas the arms 16, 18 etc. are formed from generally square section tubes, the side extension 110 is formed from a smaller, rectangular section tube, that is welded to the first arm 16. As shown in FIG. 2, to get adequate clearance from other components, the extension 110 extends out from the first arm 16 and slightly backwards away from the car path 10. The link 24 is pivotally connected between the free end of the extension 110 and the second arm 18, as shown in FIG. 2. The link 24 comprises a rod 112 with threaded ends. End bearings 114 are then screwed onto the threaded rod ends. The end bearings 114 can be adjusted, to adjust the exact length of the link 24, and locked by means of lock nuts in known manner. The end bearings 114 form the actual pivot connections, at respective first and second pivot positions.

The third and fourth arms 36, 38 and associated components are similar to the first and second arms 16, 18. However, as detailed below, the third and fourth washing wheels 40, 42 do not have to move through as great a range as the first and second washing wheels 20, 22. The arms 36, 38 are provided with longer damper and spring assemblies, denoted by the reference 71. As shown in FIG. 2, the ends of these damper and spring assemblies 71 are attached adjacent the ends of the arms 36, 38. Otherwise, the components associated with the third arm 36 correspond to those for the second arm 18, whilst the components for the fourth arm 38 correspond to those of the first arm 16. Also, there is no link corresponding to the link 24 between the third and fourth arms 36, 38.

Now, the guide channel 4 is provided on the driver's side of the vehicle. Accordingly, on this side, there will be little variation in the position of the side of the vehicle. Any variation will simply be a small variation between individual car designs. It is for this reason that the third and fourth washing wheels 40, 42 need not extend through a great range. In FIG. 2, fully retracted positions of the washing wheels are denoted by the suffix "r" whilst fully extended positions are denoted by the suffix "e". Thus, the third and fourth washing wheels have fully retracted positions 40r and 42r and fully extended positions 40e and 42e. In view of this small range of movement, problems due to the washing wheels being drawn into vehicle wheel wells do not generally arise. Similarly, there is little or no danger of the fourth washing wheel 42 engaging the front of a vehicle excessively and the arm 38 being rotated counterclockwise. If a vehicle configuration is such as to draw either of the washing wheels 40, 42 in, then it can only draw it in a limited distance. Also, the direction of rotation urges the wheels 40, 42 away from a vehicle. Consequently, the washing wheel cannot become heavily engaged with part of the vehicle body.

Also, as indicated by arrows 41, 43, the two washing wheels 40, 42 are rotated so as to be urged away from a vehicle body. Thus, the third arm 36 extends out towards a vehicle and also forwardly relative to the vehicle motion. The third washing wheel 40 is rotated clockwise, as viewed in FIG. 2, so that its side contacting the vehicle is travelling rearwardly relative to the vehicle. When the washing wheel 40 contacts a vehicle, there will be a normal or sideways force urging the washing wheel 40 away, and also due to the rotation of the wheel 40 a slight forward thrust on the wheel 40. Both these loads will tend to rotate the arm 36 counterclockwise, against the action of the spring and damper unit 71. It will be appreciated that, if the washing wheel 40 were rotated counterclockwise, then its motion over the vehicle's side would produce a force urging the arm 36 clockwise, i.e. into greater engagement with the vehicle Correspondingly, the arm 38 extends outwards and rearwardly, and the fourth washing wheel 42 is rotated counterclockwise. When the wheel 42 contacts the side of a vehicle, there is the normal side force urging it outwards, and a force rearwards, both of which forces urge the arm 38 clockwise out of engagement with the vehicle.

The first and second arms 16, 18 and the first and second washing wheels 20, 22 are similarly arranged. Thus, the first arm 16 extends outwardly and forwardly relative to the car or vehicle path 10. The first washing wheel 20 rotates counterclockwise as indicated by the arrow 21. The second arm 18 extends outwardly and rearwardly, with the second washing wheel 22 rotated clockwise as indicated by the arrow 23.

Correspondingly, the fully retracted and fully extended positions of the first and second washing wheels 20, 22 are indicated at 20r, 22r for the retracted positions and 20e and 22e for the fully extended positions. As the washing wheels 20, 22 are on the side of the vehicle remote from the guide channel 4, they have to accommodate variations in car or vehicle width. For this reason, there is a much greater difference between the retracted positions 20r, 22r and the extended positions 20e, 22e. In view of this great range of movement, there is a much greater risk of the second washing well 22 engaging a vehicle body excessively. If this occurs, the arm 18 would rotate clockwise causing even greater engagement, until ultimately the vehicle and/or apparatus are damaged. There is also a risk of a washing wheel 20, 22 being drawn into excessive engagement with the vehicle body, e.g. in a wheel well, resulting in damage to the body. It is for this reason that the link 24 is provided. The link 24 causes the two washing wheels 20, 22 to move together in unison. Ideally, a line drawn between the axes of the washing wheels 20, 22 will remain parallel to the guide channel 4. The mechanism provided will maintain this parallel relationship, and cause the washing wheels 20, 22 to move outwards and retract together.

In FIG. 2, part of a vehicle outline is shown at 115. The vehicle 115 is moved by the conveyor along the car path as indicated at 10. The driver's side of the vehicle is marked by the reference 116, whilst the passenger's side is marked by the reference 118.

First, the vehicle 115 contacts the first and third washing wheels 20, 40. This causes these washing wheels 20, 40 to be deflected, to permit the vehicle 115 to pass. As the washing wheel 40 is deflected from its position 40e, the corresponding cam 60 is rotated. The cam 60 deflects the cam arm 80, to open the water valve 74, so that water is supplied to the spray jets 90. These spray jets 90 thus spray the driver's side 116 of the vehicle. The washing wheel 40 is rotated, to cause this side 116 to be cleaned.

On the passenger's side, the first washing wheel 20 is also deflected. However, because of the action of the link 24, the second washing wheel 22, although not yet in contact with the vehicle 115 is similarly deflected. Thus, the two washing wheels 20, 22 might adopt positions 20a and 22a, when the vehicle 115 is at the location marked in FIG. 2. This movement causes the cams 60 of both the arms 16 and 18 to open their respective water valves. Water is then sprayed out from the water jets 90 associated with the first and second washing wheels 20, 22.

For this stage, the fourth washing wheel 42 is in its extended position 42e, with the water supply closed off.

For the second washing wheel 22, the link 24 and first wheel 20 ensure that it is held back at a correct position 22a for engaging the passenger side 118. There is thus no danger of this wheel 22 engaging the vehicle excessively. If the link 24 was omitted, then a second wheel 22 starting at the position 22e may well engage the vehicle excessively. The force of the vehicle front 115 on the wheel 22 may overcome the forces generated by rotation of the wheel 22, urging the arm 18 clockwise. Here, this is avoided. It is ensured that there is no excessive engagement of the vehicle front 115, so that forces generated by the forward travel of the vehicle-engaging side of the wheel 22 predominate and urge the arm 18 counterclockwise away from the vehicle. When the vehicle 115 reaches the second and fourth washing wheel 35, 22, 42, the fourth wheel 42 is deflected, corresponding to the third washing wheel 40 but independent thereof. As shown, there is never excessive engagement of the fourth wheel 42 with the vehicle front 115, due to its restricted range of movement. As it is deflected from its extended position 42e, the cam 60 associated with the fourth washing wheel 42 will open its valve 74. Water will be supplied through the spray jets 90 of all the washing wheels, and all the wheels rotated.

As the vehicle 115 progresses, the washing wheels 20, 22, 40 and 42 wash the sides 116, 118 of the vehicle, including the rocker panel and wheel wells. The contra-rotating wheels should ensure that all surfaces are well washed.

As the washing wheels 20, 22 travel down the passenger's side 118, they will encounter the wheel wells, as marked at 120 in FIG. 1. The wheel 20 will encounter the wheel well 120 first. As described above, due to its direction of rotation, it will not tend to be drawn into the wheel well 120. Also, provided the wheel well 120 is sufficiently far back from the front of the vehicle, the second washing wheel 22 will be contacting the side 118, which additionally will prevent the wheel 20 being drawn into the wheel well. Thus, provided both wheels 20, 22 are contacting the vehicle side 118, they each in turn assist in preventing excessive engagement of a wheel well. In any event, the respective rearward and forward travel of the vehicle-engaging sides of the wheels 20, 22 should ensure that the wheels 20, 22 do not engage the side 118 excessively.

The washing wheels 40, 42 will then travel down the driver's side 116 of the vehicle. They will travel independently. For a typical vehicle design, they will move out slightly to enter each wheel well as it is encountered. However, as detailed above, due to their limited range of movement, there is very little danger of either of the washing wheels 40, 42 being sucked or drawn into a wheel well so as to damage the surrounding body work. Again, the respective rearward and forward travel of the vehicle-engaging sides of the wheels 40, 42 should ensure that wheels 40, 42 do not engage the driver's side 116 excessively. The rotation urges the wheels out of engagement.

When the vehicle 115 leaves the apparatus, it will first leave the first and third washing wheels 20, 40. The independent third washing wheel 40 will thus be urged out by its spring and damper unit 71 to the position 40e. This will close off the water supply to its water jets 90. However, whilst the second washing wheel 22 is in contact with the vehicle side 118, the first washing wheel 20 will remain at least partially extended with its water supply turned on.

Only when the vehicle 115 leaves the third and fourth washing wheels 22, 42 will the first washing wheel 20 be free to move to its extended position 20e. At this point, the first and second wheels 20, 22 will move outwards together to their extended positions 20e, 22e, thereby shutting off the water supply to the water jets 90 associated therewith. The fourth washing wheel 42 will correspondingly move out to its extended position 42e closing off the water supply.

The washing wheels 20, 22, 40 and 42 will then remain in their extended positions, with the water supply turned off, until another vehicle is encountered. The control of the hydraulic motors 98 can either be associated with, or separate from, the control of the water supply to the washing wheels.

We claim

1. A washing apparatus, for use in a vehicle washing installation in which a vehicle is moved forwardly along a vehicle path, the washing apparatus comprising a support means, first and second arms, which are longitudinally spaced relative to the vehicle path and each of which is pivotally mounted at one end thereof and at a respective pivot location to the support means and extends towards the vehicle path, with the first arm extending forwardly and the second arm extending rearwardly relative to the vehicle path, a first washing wheel rotatably mounted to the other end of the first arm, a second washing wheel rotatably mounted to the other end of the second arm, drive means for rotating the first washing wheel so that the vehicle engaging side thereof travels rearwardly and for rotating the second washing wheel so that the vehicle-engaging side thereof travels forwardly, and biasing means urging the first and second washing wheels towards the vehicle path.

2. A washing apparatus as claimed in claim 1, wherein the first and second arms extend towards one another, and which includes a linkage means pivotally connected to the first and second arms and such that the first and second washing wheels move together towards and away from the vehicle path.

3. A washing apparatus as claimed in claim 2, wherein the linkage means comprises a rigid link pivotally connected to the first arm at a first pivot position and to the second arm at a second pivot position, with the first and second pivot positions being located on opposite sides of a vertical plane extending through the pivot locations between the first and second arms and the support means.

4. A washing apparatus as claimed in claim 3, wherein the first arm includes a side extension, which extends through said plane and includes the first pivot position at its free end.

5. A washing apparatus as claimed in claim 4, wherein the side extension is inclined relative to the first arm, so as to form an abtuse angle relative to the portion of the first arm adjacent said other end thereof.

6. A washing apparatus as claimed in claim 1 or 5, wherein the drive means comprises a first drive motor on the first arm for rotating the first washing wheel in one direction, and a second drive motor on the second arm for rotating the second washing wheel in the opposite direction.

7. A washing apparatus as claimed in claim 1, wherein the biasing means comprises, for each arm, a spring and damper assembly, which is pivotally connected to the support means and to the respective arm.

8. A washing apparatus as claimed in claim 5, wherein, for each arm, the biasing means comprises a spring and damper assembly, which is pivotally connected to the support means and to the respective arm on the side of the arm facing the other arm.

9. A washing apparatus as claimed in claim 7 or 8, wherein each spring and damper assembly comprises a damper comprising a piston and a cylinder, and a spring mounted between the piston and the cylinder, with one end of the spring being adjustable to vary the spring load.

10. A washing apparatus as claimed in claim 3, wherein each of the first and second arms is pivotally connected to the support means by a respective shaft, wherein a cam is provided on each shaft, and wherein for each arm, a water valve including an operating plunger is mounted on the support means, for actuation by the respective cam when the respective arm is deflected away from the vehicle path.

11. A washing apparatus as claimed in claim 10, wherein each cam comprises a circular collar and a cylindrical projection eccentric to the circular collar.

12. A washing apparatus as claimed in claim 10 or 11, wherein for each washing wheel, a pipe is mounted on the support means, spray jets are provided connected to the pipe and directed to the respective washing wheel, and the pipe is connected to the respective water valve.

13. A washing apparatus as claimed in claim 5 or 10, wherein the drive means comprises, for each washing wheel, an hydraulic motor mounted on the other end of the respective arm.

14. A washing apparatus as claimed in claim 5 or 10, in which the washing wheels are mounted for rotation about vertical axes.

15. A washing apparatus as claimed in claim 5 or 10, in which the washing wheels are mounted for rotation about vertical axes, and each washing wheel, in use, has a generally frustro-conical shape, with its bottom having a larger diameter than the top.

16. A washing apparatus as claimed in claim 3, wherein with the first and second washing wheels mounted for washing one side of a vehicle, the apparatus includes for washing the other side of the vehicle an additional support means on the other side of the vehicle path, a third arm which is pivotally mounted at one end thereof to the additional support means and extends towards the vehicle path, a fourth arm which is pivotally mounted at one end thereof to the fourth support means and extends towards the vehicle path, with the third and fourth arms extending towards one another, a third washing wheel rotatably mounted to the other end of the third arm, a fourth washing wheel rotatably mounted to the other end of the fourth arm, additional biasing means urging the third and fourth washing wheels towards the vehicle path, and additional drive means for rotating the third and fourth washing wheels in opposite directions so that sides of the washing wheels facing a vehicle travel away from one another.

17. A washing apparatus as claimed in claim 16, wherein all of the washing wheels are vertical.

18. A washing apparatus as claimed in claim 17, wherein the drive means and the additional drive means comprises, for each washing wheel, a respective hydraulic motor mounted on the corresponding arm, and wherein the biasing means comprises, for each arm, a spring and damper assembly.

19. A washing apparatus as claimed in claim 1, wherein with the first and second washing wheels mounted for washing one side of a vehicle, the apparatus includes for washing the other side of the vehicle an additional support means on the other side of the vehicle path, a third arm, which is pivotally mounted at one end thereof to the additional support means and extends towards the vehicle path, a fourth arm which is pivotally mounted at one end thereof to the additional support means and extends towards the vehicle path, with one of the third and fourth arms extending forwardly and the other of the third and fourth arms extending rearwardly relative to the vehicle path, a third washing wheel rotatably mounted to the other end of the third arm, a fourth washing wheel rotatably mounted to the other end of the fourth arm, additional biasing means urging the third and fourth washing wheels towards the vehicle path, and additional drive means for rotating the third and fourth washing wheels in opposite directions, the direction of rotation of the two washing wheels being such as to urge the third and fourth washing wheels away from a vehicle.

20. A washing apparatus as claimed in claim 19, 17 or 18, wherein each of the washing wheels, in use, is generally frustro-conical with its bottom diameter being greater than 21. A washing apparatus as claimed in claim 19, 17 or 18, wherein for each arm, the support means comprises a column, the arm is pivotally connected to the column by a shaft, a cam is mounted on the shaft, a water control valve is mounted on the column and includes an actuating plunger for actuation by the cam, a pipe is secured to the column and connected to the water valve, and spray jets are provided on the pipe, the water valve being opened by rotation of the cam resulting from displacement of the respective washing wheel away from the vehicle path.

* * * * *